United States Patent
Ha (10) Patent No.: US 11,537,688 B2
(45) Date of Patent: Dec. 27, 2022

(54) SYSTEM AND METHOD FOR PROCESSING COPYRIGHT AND PROFIT DISTRIBUTION OF CLOTHES FASHION DESIGN USING BLOCKCHAIN

(71) Applicant: D3D Co., Ltd., Seoul (KR)

(72) Inventor: Ji-Tae Ha, Seoul (KR)

(73) Assignee: D3D CO., LTD., Seoul (KR)

( * ) Notice: Subject to any disclaimer, the term of this patent is extended or adjusted under 35 U.S.C. 154(b) by 252 days.

(21) Appl. No.: 16/986,944

(22) Filed: Aug. 6, 2020

(65) Prior Publication Data
US 2022/0043891 A1    Feb. 10, 2022

(51) Int. Cl.
*G06Q 30/02* (2012.01)
*G06F 21/10* (2013.01)
(Continued)

(52) U.S. Cl.
CPC ......... *G06F 21/105* (2013.01); *G06K 9/6215* (2013.01); *G06Q 20/12* (2013.01); *G06Q 30/0631* (2013.01); *G06Q 30/0641* (2013.01); *H04L 9/0643* (2013.01); *G06Q 50/01* (2013.01); *H04L 9/50* (2022.05)

(58) Field of Classification Search
CPC ............... G06Q 20/12; G06Q 30/0631; G06Q 30/0641; G06Q 50/01
See application file for complete search history.

(56) References Cited

U.S. PATENT DOCUMENTS 11,232,503 B1 * 1/2022 Rodriguez ........... G06Q 20/401
2019/0311470 A1 * 10/2019 Lee ......................... G06N 20/00
(Continued)

FOREIGN PATENT DOCUMENTS

KR    2001-0079421    8/2001
KR    10-2009-0051518    5/2009
(Continued)

OTHER PUBLICATIONS

"Which is Plagiarism: Fashion Image Retrieval Based on Regional Representation for Design Protection" (Lang, Yining et al. 2020 IEEE CVF Conference on Computer Vision and Pattern Recognition (CVPR), conference data Jun. 19, 2020, published on Aug. 5, 2020); (Year: 2020).*

(Continued)

*Primary Examiner* — James M Detweiler
(74) *Attorney, Agent, or Firm* — Kile Park Reed & Houtteman PLLC (57) ABSTRACT

The present invention includes a first operation (S100) of, by a terminal 10a, registering a clothes fashion design in a management site, a second operation (S110) of, by a management server (20), determining similarity between corresponding design data and a previously registered work, a third operation (S120) of, when the similarity is greater than or equal to a reference value as a result of the determining, generating a blockchain ledger related to a corresponding work, a fourth operation (S130) of, when the similarity is less than the reference value as a result of the determining, generating a blockchain ledger related to a new creative work, and a fifth operation (S140) of, when a profit on the clothes fashion design is generated, by a royalty management server, distributing the profit according to the similarity through a blockchain value.

5 Claims, 7 Drawing Sheets

(51) Int. Cl.
  *G06Q 20/12* (2012.01)
  *G06Q 30/06* (2012.01)
  *G06K 9/62* (2022.01)
  *H04L 9/06* (2006.01)
  *G06Q 50/00* (2012.01)
  *H04L 9/00* (2022.01)

(56) References Cited

U.S. PATENT DOCUMENTS

2019/0318348 A1* 10/2019 Brenner .............. G06Q 50/184
2020/0186338 A1* 6/2020 Andon .................. H04L 9/0866
2021/0271738 A1* 9/2021 Hatcher ............... G06Q 50/184

FOREIGN PATENT DOCUMENTS

| KR | 10-2016-0114749 | 10/2016 |
| KR | 10-2018-0017597 | 2/2018 |
| KR | 10-2020-0034917 | 4/2020 |

OTHER PUBLICATIONS

"Fashion Meets the Blockchain: How Blockchain Can Solve Fashion's Woes" (Whittle, Ben published Feb. 7, 2019 at coincentral. com/articles) (Year: 2019).*

"How the Fashion Industry is Getting Benefits Using Blockchain Technology" (Published on Aug. 26, 2019 in "Statecraft Tech" online) (Year: 2019).*

* cited by examiner

SYSTEM AND METHOD FOR PROCESSING COPYRIGHT AND PROFIT DISTRIBUTION OF CLOTHES FASHION DESIGN USING BLOCKCHAIN

TECHNICAL FIELD

The present invention relates to a system and a method for processing a copyright and profit distribution of a clothes fashion design using a blockchain, and more particularly, to a system and a method, in which blockchain technology is matched with information about a clothes fashion design exchanged online, thereby easily identifying a copyright holder of the design and efficiently distributing a profit such as a royalty.

BACKGROUND ART

Recently, as an interest in fashion has increased, information about clothes has been actively exchanged online.

Fashion information online appears in various forms, such as clothes being posted and purchased on a website on the Internet and fashion information being exchanged through a social network service (SNS) or the like.

In particular, technology for a system for ordering, manufacturing, and delivering clothes on the Internet is being developed.

However, it is practically difficult to clearly specify a copyright holder of a clothes fashion design.

That is, the Copyright Act provides that a copyright is generated with the creation of a work. However, in reality, when a clothes fashion design is created, in most cases, the created clothes fashion design is not copyrighted. Thus, in this case, it is difficult to determine to whom the copyright of the clothes fashion design belongs.

In addition, when every clothes fashion design is copyrighted, it is a waste of cost and time.

Due to the nature of a clothes fashion, since similar designs can be derived from an initial design, in this case, it is difficult to specify a copyright holder of the derived designs.

RELATED ART DOCUMENTS

Patent Documents (Patent Document 1) Patent Application No. 10-2015-26274 (Title: CRYPTOCURRENCY TRANSACTION METHOD USING BLOCKCHAIN STRUCTURE)

SUMMARY OF THE INVENTION

The present invention is directed to providing a system and a method, in which blockchain technology is matched with information about a clothes fashion design exchanged online, thereby easily identifying a copyright holder of the design and efficiently distributing a profit such as a royalty.

According to an embodiment of the present invention, there is provided a system for processing a copyright and profit distribution of a clothes fashion design using a blockchain, the system including a terminal (10a) which is mounted with a related application to search for and register a clothes fashion design on a screen of the terminal (10a), a management server (20) which processes clothes design data transmitted from the terminal 10a through a network to determine similarity of the clothes design data and generate a blockchain, and a royalty management server which interworks with the management server (20) to process a copyright and profit distribution of the traded clothes fashion design.

According to an embodiment of the present invention, there is provided a system for processing a copyright and profit distribution of a clothes fashion design using a blockchain, the system including a terminal (10a) which is mounted with a related application to search for and register a clothes fashion design on a screen of the terminal (10a), a management server (20) which processes clothes design data transmitted from the terminal 10a through a network to determine similarity of the clothes design data and generate a blockchain, and a royalty management server which interworks with the management server (20) to process a copyright and profit distribution of the traded clothes fashion design, wherein the management server (20) includes an input unit (41) which receives the clothes design data from the terminal (10a), a comparison unit (42) which determines the similarity between the clothes design data and a previously registered work, a blockchain generation unit (49) which generates a blockchain ledger related to a compared work, a calculation unit (45) which generates a block chain ledger related a corresponding work when the similarity is greater than or equal to a reference value as a result of the determining and generates a blockchain ledger related to a new related to a new creative work when the similarity is less than the reference value, and a royalty management unit (48) which distributes and manages a royalty according to the generated blockchain, the blockchain stores a digital signature for verifying authenticity of data and transaction information and includes a block header, the transaction information, and design information, the block header includes a version, a previous block hash, a merkle hash, a time, a bit, and a nonce, when the block header is formed, a process of determining a first block hash value, and when a next transaction is made, adding a second block hash value is repeated to form the blockchain, and design information includes an identification code of a designer and shape data and similarity data of a fashion design.

DETAILED DESCRIPTION OF EXEMPLARY EMBODIMENTS

Hereinafter, a method of processing a copyright and profit distribution of a clothes fashion design using a blockchain according to one embodiment of the present invention will be described in detail with reference to the accompanying drawings.

As shown in FIG. 1 to 6, the method of processing a copyright and profit distribution of a clothes fashion design using a blockchain proposed in the present invention includes a first operation (S100) of, by a terminal 10a, registering a clothes fashion design in a management site, a second operation (S110) of, by a blockchain management server 20 (hereinafter, referred to as a "management server"), determining similarity between corresponding design data and a previously registered work, a third operation (S120) of, when the similarity is greater than or equal to a reference value as a result of the determining, generating a blockchain ledger related to a corresponding work, a fourth operation (S130) of, when the similarity is less than the reference value as a result of the determining, generating a blockchain ledger related to a new creative work, and a fifth operation (S140) of, when a profit on the clothes fashion design is generated, a royalty management server, distributing the profit according to the similarity through a blockchain value.

Figure 6:
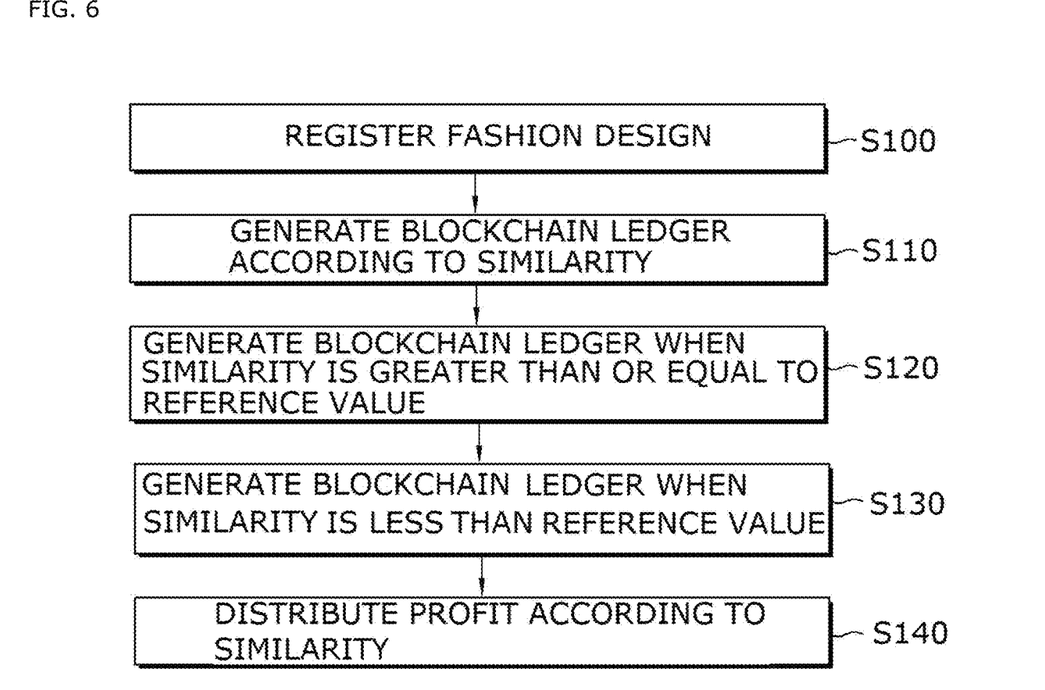
FIG. 6 is a flowchart illustrating a method of processing a copyright and profit distribution of a clothes fashion design according to another embodiment of the present invention.

In such a method of distributing the profit, in the first operation (S100), a designer creates and registers the clothes fashion design in the management site.

Figure 1:
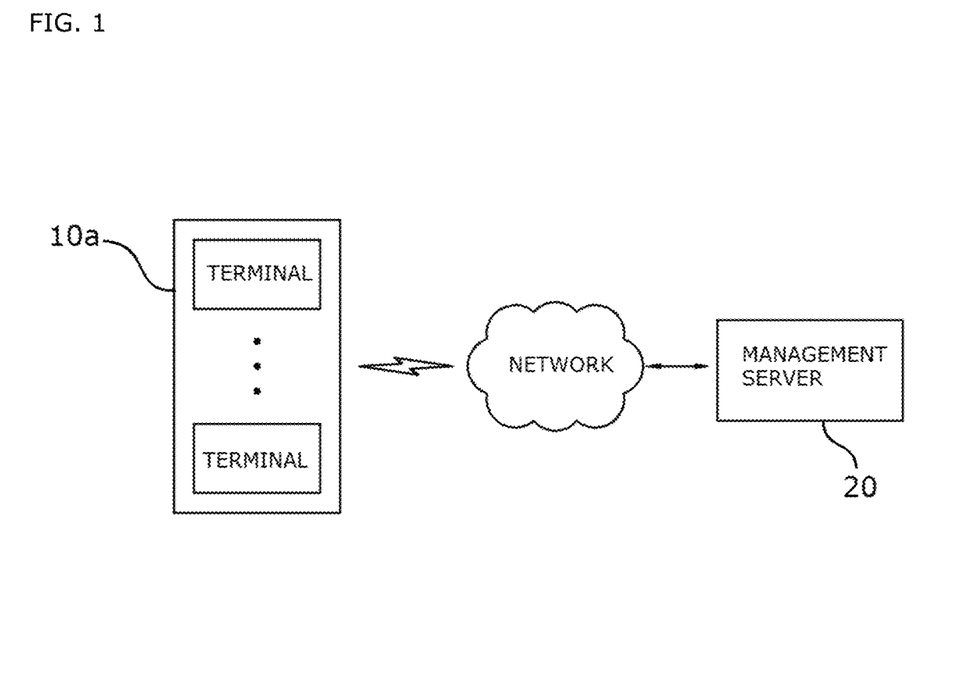
FIG. 1 is a schematic diagram illustrating a system for processing a copyright and profit distribution of a clothes fashion design using a blockchain according to an embodiment of the present invention.

That is, an application (hereinafter, referred to as an "app") capable of designing a clothes fashion is mounted on the terminal 10a such as a smartphone, a personal computer (PC), or a tablet PC. A plurality of terminals 10a may be provided. Each orderer performs a task through the terminal 10a, such as a task of searching for or registering a clothes fashion design.

In this case, the orderer may be a clothing product seller such as a small business owner, a clothing trader, an organization or club of each workplace, or a clothes fashion design worker who wants to purchase clothes.

Accordingly, such an orderer may perform procedures of ordering clothes, transmitting clothes data, generating a blockchain for a clothes design, and distributing a royalty through the terminal 10a.

A user may easily design desired clothes in a drag manner on a screen of the terminal 10a and may also order corresponding clothes.

Figure 2A:
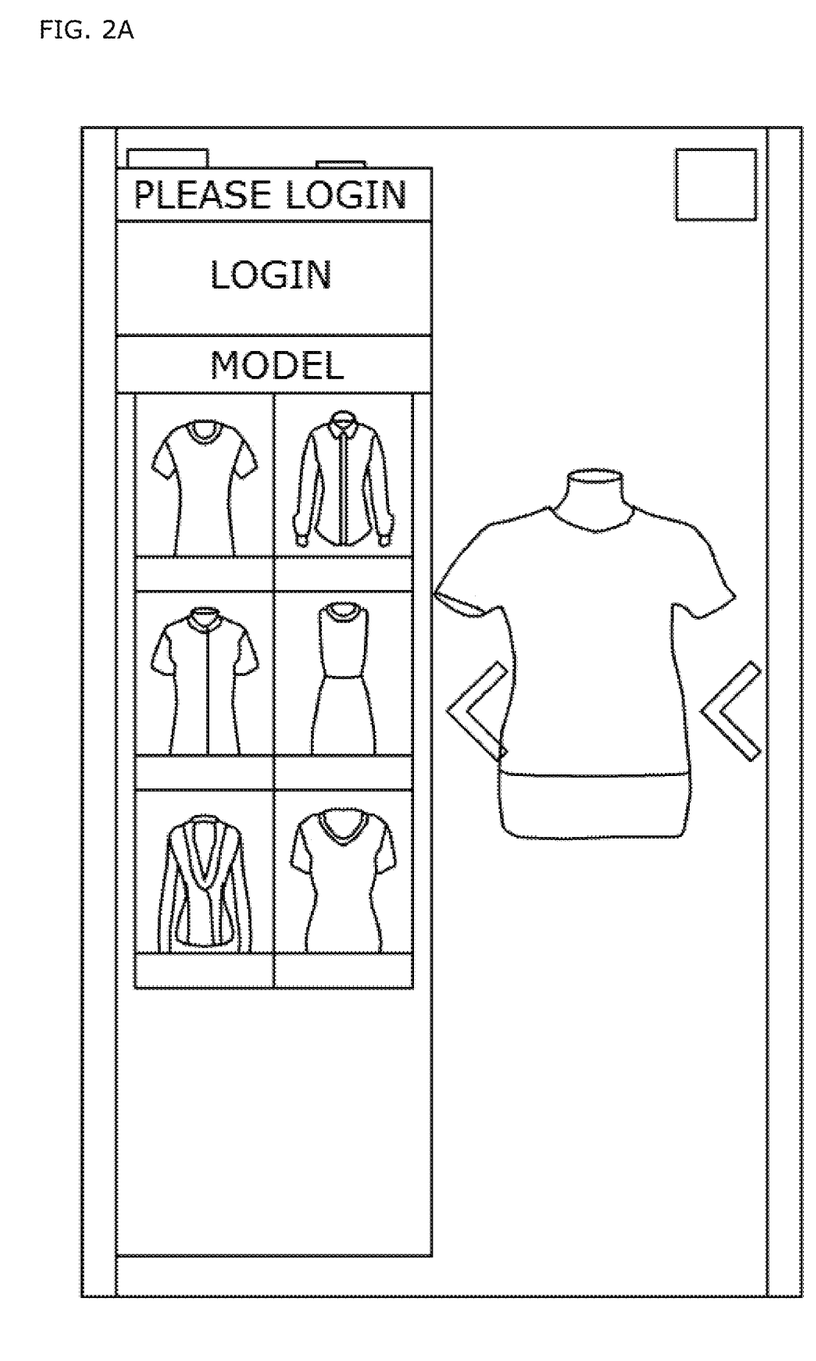
FIG. 2A to 2C are diagrams illustrating a terminal screen of the system illustrated in FIG. 1 and illustrating a process of creating and registering a design.
Figure 2B:
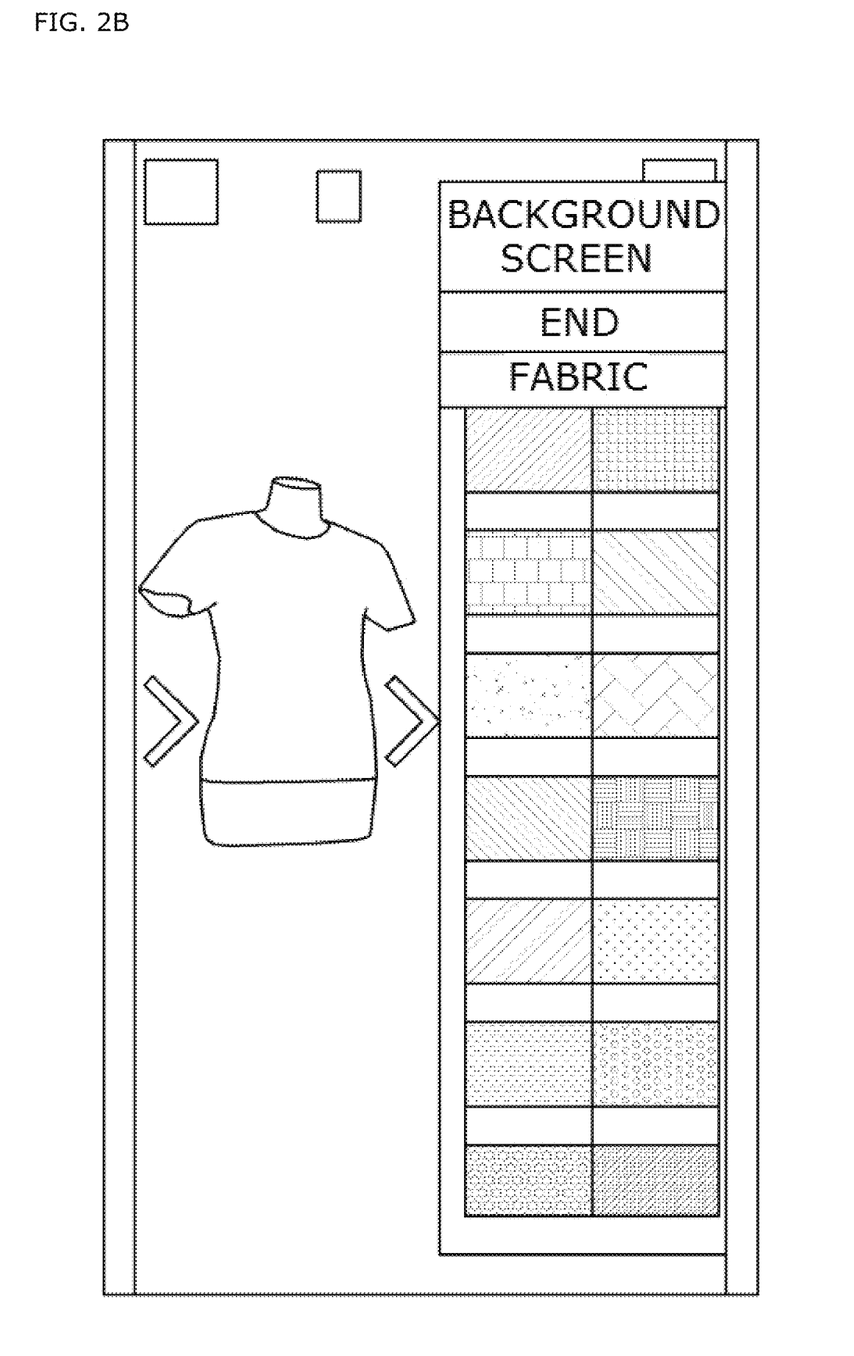
Figure 2C:
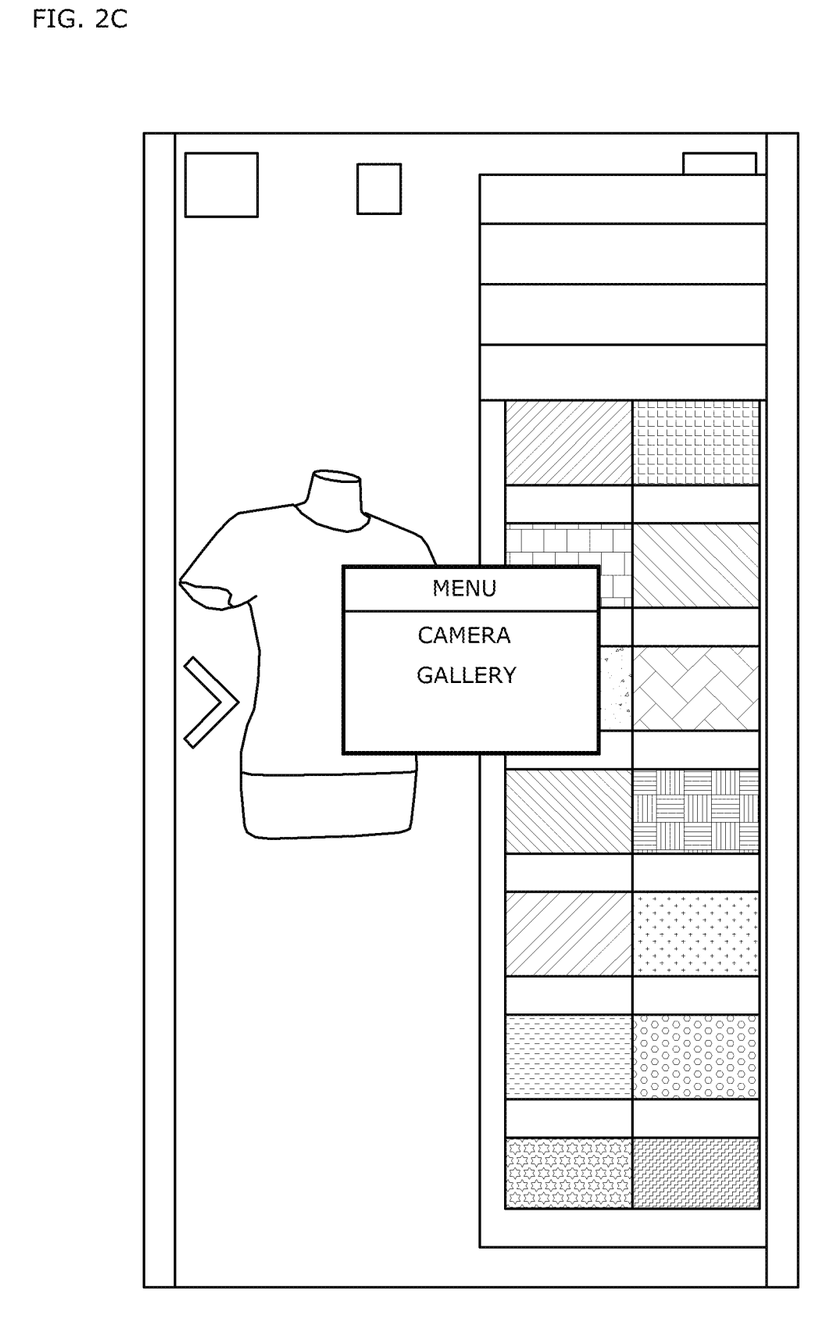

For example, when the user activates a related app, as shown in FIG. 2A to 2C, an initial screen of the terminal 10a is displayed. When a desired design is specified on the screen through a touch or the like, a corresponding model is displayed on the screen.

When a fabric menu is selected on the screen, an appropriate fabric is selected. When a fabric is selected, clothes worn by a model are converted to the fabric. In this case, a color may also be selected.

In addition, the arm length, waist size, button, and zipper shape of a design are selected.

As described above, a desired clothes fashion design is completed on the terminal 10a.

Alternatively, image data may also be obtained by photographing clothes using an input device such as a digital camera.

When the clothes fashion design is registered, the second operation (S110) of, the management server 20, determining the similarity between the corresponding design data and the previously registered work is performed.

The second operation (S110) is performed by the management server 20. The management server 20 receives design data and determines the similarity between the design data and the previously registered work to generate a related blockchain ledger. When similarity is greater than or equal to a reference value as a result of the determining, the management server 20 generates a blockchain ledger related to a corresponding work. When the similarity is less than the reference value as a result of the determining, the management server 20 generates a blockchain ledger related to a new creative work.

Figure 4:
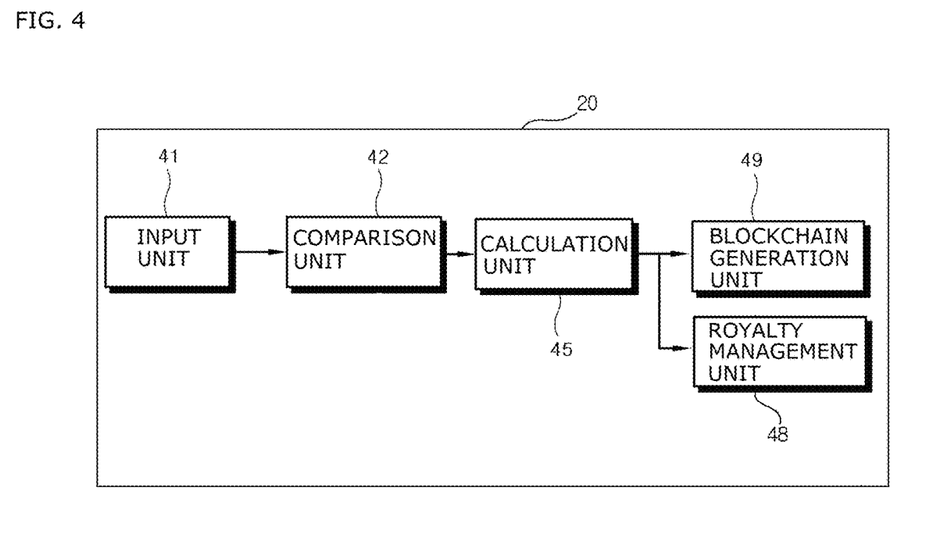
FIG. 4 is a schematic block diagram illustrating a structure of a management server illustrated in FIG. 1.

The management server 20 includes an input unit 41 which receives clothes design data from the terminal 10a, a comparison unit 42 which determines similarity between the clothes design data and a previously registered work, a blockchain generation unit 49 which generates a blockchain ledger related to a compared work, and a calculation unit 45 which generates a blockchain ledger related to a corresponding work when the similarity is greater than or equal to a reference value and generates a blockchain ledger related to a new creative work when the similarity is is less than the reference value.

In the management server, the input unit 41 may receive the clothes design data transmitted from the terminal 10a.

For example, the input unit 41 receives a shape of clothes, a type of fabric, an order quantity, a delivery date, and the like.

The comparison unit 42 determines similarity between an input clothes design and the previously registered work. That is, the comparison unit 42 compares the input design data with existing stored design data to determine similarity.

In this case, similarity of a design may be determined using various algorithms, and for example, there is a method of determining similarity by comparing contours.

That is, the comparison unit 42 uses a method of recognizing a shape of a design based on feature points and comparing an approximate contour algorithm of the design with an approximate contour algorithm of design data pre-stored in a database to determine similarity.

First, a design image is image-processed in a corresponding module. In image processing, shape information and proportional values about each portion of a clothes design may be extracted through a shape, color distribution, and background labeling transformation of the design.

More specifically, a method of extracting feature points is used. The method is a method of marking dots at points capable of representing shape features of clothes and calculating a functional relationship between the points to convert features of a clothes design into data.

For example, the method is a method of marking points at feature portions to quantify an arm span, a cervical length, and shapes of a waistline and a neck line and connecting the points to infer a shape.

In addition, a color distribution of a design is calculated, and the color distribution is calculated by comparing pixel values of input colors with each other.

For example, by using color values and variance values of a design, a color distribution may be calculated using two-dimensional Gaussian modeling in a normalized color space.

In a process of converting a color into data, a process of normalizing an input image using luminance components is performed in order not to be sensitive to a change in lighting or changes in other ambient conditions.

That is, when color values uses a three-dimensional color model of a red-green-blue (RGB) color, the color values are normalized using luminance components R, G, and B. The color values normalized using the luminance components are expressed as contrast values.

When a contrast value is determined for each pixel, a boundary line is determined in binary. That is, when the contrast value of each pixel is greater than or equal to a threshold value, a color may be determined as a white color, when the contrast value of each pixel is less than the threshold value, a color may be determined as a black color to determine the boundary line.

Labeling is performed to distinguish a design from a background.

That is, an input image is scanned to find connected components, thereby extracting a clothes fashion design. When the connected components are analyzed, the size and position of each lump may be analyzed, which is used as important information in determining a candidate region.

In other words, when a scanned fashion design is regarded as a single image lump, the single image lump is scanned from top to bottom (A→C→E) and from left to right (A→B) to find only a portion corresponding to a region of a clothes design from an entire image.

Figure 3:
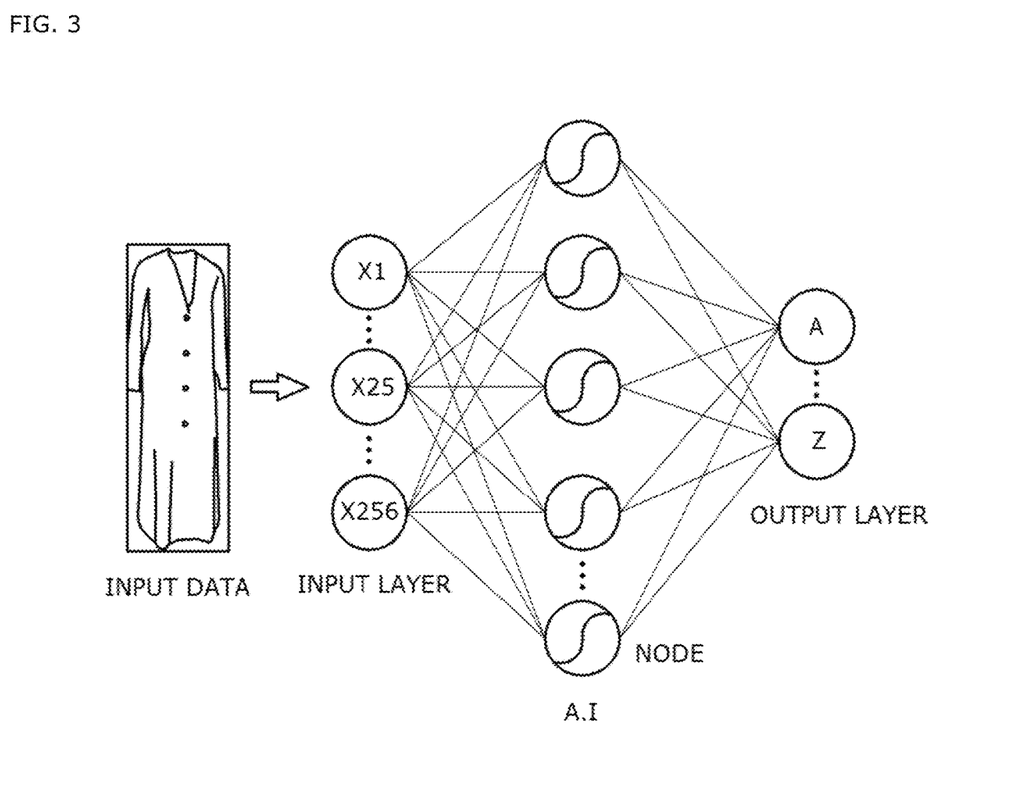
FIG. 3 is a diagram illustrating a state in which similarity of a clothes design pattern is determined through a deep learning method.

Alternatively, when similarity of a design pattern is determined, the similarity may be determined through deep learning as shown in FIG. 3.

That is, deep learning is a machine learning method built based on an artificial neural network (ANN) in order for a computer to learn on its own using a plurality of pieces of data as a human.

When an ANN is used, clothes design data may be classified and clustered, and similarity may be determined by placing various layers on data that is desired to be classified or clustered.

That is, features of a clothes design may be extracted using an ANN, and each design may be classified and clustered using the extracted features as input values of another machine learning algorithm to determine similarity.

Such an ANN includes a deep neural network including multiple layers, each layer includes a plurality of nodes, and a calculating process of classifying clothes designs is actually performed in each node. The calculating process is designed to simulate a process performed in neurons constituting a human neural network.

When the node receives a stimulation of certain intensity or more, the node responds to the stimulation. A magnitude of the response is approximately proportional to a value obtained by multiplying an input value by a coefficient (or weight) of the node. In general, the node receives a plurality of inputs and has the number of coefficients equal to the number of the inputs. Therefore, different weights may be given to the plurality of inputs by adjusting the coefficients.

Finally, multiplied values are all added up to obtain the sum, and the sum is input to an activation function. A result of the activation function corresponds to an output of the node, and the output is ultimately used for classification or regression analysis.

Each layer includes the plurality of nodes, and whether to activate/deactivate each node is determined according to an input value. In this case, input data becomes an input of a first layer, and then, an output of each layer becomes an input of a next layer again.

All coefficients continue to slightly change in a process of learning a clothes design, and as a result, the coefficients reflect which input is considered to be important by each node. A process of training the deep neural network is a process of updating the coefficient.

When a clothes design is learned, in the deep neural network, features on different layers are learned for each layer.

That is, in features on a lower layer, simple and specific features (for example, a horizontal line, a vertical line, or a diagonal line constituting a design pattern) are learned, and in features of a higher layer, more complex and abstract features (for example, a shape constituting a design pattern, such as a human shape, a vehicle shape, or a face shape) are learned.

Through such an abstraction learning process, the deep neural network understands high-level data, and hundreds or billions of coefficients are involved in such a process (a nonlinear function is used in the process).

In addition, a latent structure of data may be grasped using the deep neural network. That is, it is possible to grasp a latent structure such as a shape or pattern of a clothes design. Thus, even when data is not labeled, similarity between pieces of data may be grasped effectively, and as a result, the deep neural network is effective for clustering clothes design data.

For example, by using the deep neural network, a large amount of clothes design data may be received to collect and classify similar designs.

The deep neural network is different from general machine learning in that a feature extraction is automatically performed.

In the past, in order to extract effective features, an expert in a related field should devise and apply a formula or method for extracting features directly for a long time by himself or herself. There is a problem in that it takes a long time to develop, evaluate, and supplement the method.

In the deep neural network, an algorithm is designed such that a computer performs such a process, and the deep neural network is trained to perform the process much faster and more effectively than humans.

Even when unlabeled data is learned, the deep neural network may automatically extract features of clothes design data. There are several methods of automatically extract the features, but in such a process, the unlabeled data is learned such that an input is the same as an output when passing through the deep neural network.

Whatever the type of a label (the input is used as itself/a separate label is used), the deep neural network finds a correlation between the input and the output. In some cases, after the deep neural network is trained to some extent using labeled data, the deep neural network may be continuously trained by adding unlabeled data. When such a method is used, it is possible to maximize performance of the deep neural network.

A last layer of the deep neural network is an output layer. An activation function of the output layer is mostly logistic or softmax function, and a probability of a specific label may be finally calculated in the output layer. For example, when a clothes design is input, whether a shape of a design is an object, a human, or a cat may be determined using each probability.

First, all coefficients of the deep neural network are initialized before learning begins. Clothes design data is repeatedly input to perform learning. When learning is smoothly performed, the coefficients may be updated to appropriate values, and various classifications and predictions are possible using the ANN.

In a learning process, a process of updating the coefficients is repeatedly performed.

A principle of updating the coefficients uses a method of first estimating the coefficients, measuring errors that occur when the coefficients are used, and then slightly updating the coefficients based on the errors.

In this case, a plurality of coefficients of the deep neural network are collectively called a model, and the model may be in an initialized state or a trained state.

The initialized model does not perform any meaningful operation, but as learning is performed, the model outputs results similar to reality rather than arbitrary values This is because the ANN does not know anything until data is input, and a reason for initializing the coefficients to arbitrary values is the same. As data is read, coefficients are slightly updated in the right direction.

Through such an updating process, the ANN may cluster similar designs by classifying input clothes designs.

When the second operation (S110) of determining the similarity of the design is completed and when the similarity is greater than or equal to the reference value, the third operation (S120) of generating the blockchain ledger related to the corresponding work is performed.

That is, when the similarity is greater than or equal to the reference value, the calculation unit 45 interworks with the blockchain generation unit 49 to generate a blockchain ledger including corresponding design data and similarity values.

In this case, a blockchain is generated by the block chain generation unit 49, and blockchain information includes a digital signature for verifying authenticity of data, a block header, transaction information, and design information.

More specifically, the blockchain uses a method in which all information traded on the Internet may be disclosed, anyone may generate transaction information, and the traded information may be copied to store and provide copies thereof to everyone and synchronize the copies. Therefore, since formation is stored in servers of all users participating in the transaction and thus a record is prevented from disappearing, the blockchain is also referred as a distributed public ledger.

The digital signature is attached to or logically coupled to data and allows authenticity of data to be verified using an asymmetric key and a hash function.

This digital signature is used for the purpose of verifying an identity of a signer and indicating a signer's approval for contents of data.

The block header of the blockchain includes six pieces of information such as a version, a previous block hash, a merkle hash, a time, a bit, and a nonce.

In the block header, the version refers a version of software and a version of a protocol.

The previous block hash refers to a block hash of a block right ahead in the blockchain.

The merkle hash refers to a hash value positioned at a tree root when a transaction hash of individual transaction information is formed in a binary tree form.

The time refers to a time at which a block is generated. The bit refers to a numerical value for adjusting difficulty.

The nonce refers to the number of times of calculations increased from zero by one until a hash value satisfying a condition is found.

In the block header, a block hash serving as an identifier of a block may be obtained using the six pieces of information of the block header as input values.

The block hash is obtained as a 32-byte numerical value that is a value calculated by inputting the six pieces of information of the block header and applying a SHA-256 hash function thereto.

The transaction information is stored as information that is traded by each user. For example, a payment amount, which is transmitted from a user A to a user B, is stored.

Design information includes shape data and similarity data of the above-described fashion design.

That is, the digital information may include data obtained by digitally processing a shape of the fashion design. In addition, the digital information may include identification information of a creator who has created the fashion design, for example, a copyright holder.

The block header having such a configuration will be described as an example.

When a plurality of users trade, a hash value of each individual transaction is first determined. The hash value of each individual transaction is formed in a binary tree form to calculate a hash value of a merkle tree.

As described above, the calculated hash value of the merkle tree is input to merkle tree hash information among the six pieces of information of the block header.

Therefore, the block header includes the six pieces of information such as the version, the previous block hash, the merkle hash, the time, the bit, and the nonce, and the six pieces of information are calculated as block hash values.

Eventually, individual transaction information is converged into a hash value of a merkle tree, and among the six pieces of information of the block header, five pieces of information such as the version, the previous block hash, the merkle hash, the time, and the bit are values that are already determined at the time of generating the block hash and thus are not changed.

However, last information, that is, the nonce, is a value that is not determined and should be newly calculated. A process of calculating a value of the nonce to finally obtain a block hash value and then generating a valid block having the block hash value as an identifier is a proof-of-work, that is, a mining process.

As described above, the design information includes the shape data and similarity data of the fashion design. In this case, the digital information includes identification information of a creator who has created the fashion design, for example, a copyright holder As described above, respective blocks are generated, and the blocks are connected to form a blockchain.

That is, as described above, among the six pieces of information constituting the block head, a value of the previous block hash is a hash value of a block generated immediately before a block that is being generated. Therefore, a block is connected to a previous block in such a manner that the block includes a hash value of the previous block.

For example, when a plurality of blocks are generated, each block includes a block hash value.

In this case, a block hash value of a first block becomes a previous block hash value of a second block, and a block hash value of the second block is determined by the previous block hash value. The block hash value of the second block becomes a previous block hash value of a third block, and a block hash value of the third block is determined by the previous block hash value. That is, a procedure is performed in the following order.

The plurality of blocks are connected to each other to form a blockchain through such a method.

In this case, each block includes shape data, similarity data, and creator data of a fashion design as design information, and thus, when a blockchain is formed, the pieces of information may be connected and shared with each other.

Meanwhile, the blockchain formed as described above is not limited to the blocks being simply connected, and data should prove to be reliable data. Such a process is a proof-of-work.

That is, a process of obtaining a nonce value to finally obtain a block hash value and generating a valid block having the block hash value as an identifier is the proof-of-work. After all, obtaining the nonce value is the key of the proof-of-work.

The nonce value refers to a value that allows a block hash value calculated using the nonce value as one of input values to be smaller than a specific number.

Due to the nature of a hash function, when an input value, which allows a certain hash value (referred to as A) to be output as a result, is to be found, the input value may not be found through a method of calculating back from the A, and the input value needs to be found by continuously and randomly changing the input value until the result becomes the A and calculating a hash value.

Then, in order to make a block hash value smaller than a specific number, it is necessary to continuously repeat a comparing operation of determining whether a hash value, which is obtained by continuously changing an input value of a block hash, is smaller than the specific number.

An input value of a block hash is a block header, and the block header includes six pieces of information. Among the six pieces of information, values of five pieces of information are fixed and thus may not be changed. Only a nonce value may be changed.

That is, when a hash value, which is calculated by continuously changing the nonce value, is smaller than a specific number, the nonce value at that time is determined as a nonce value of a newly generated block. When the hash value smaller than the specific number is finally determined as the block hash value of the newly generated block, the proof-of-work is completed.

Meanwhile, a mining process of calculating the nonce value requires a large number of times of hash calculations and requires a mining machine for performing the calculations and a huge amount of electricity capable of operating the mining machine. Thus, when there is no reward for such costs, a blockchain will not be mined.

Therefore, a process of calculating a reward for the mining of such a blockchain is performed. Describing a difficulty coin as an example, a reward for the difficulty coin is the sum of a newly issued difficulty coin and a transaction fee of a transaction included in a corresponding block.

The new issuance of a difficulty coin is performed through a method in which a transaction, in which a certain amount of the difficulty coin is deposited into a miner's wallet when a miner first generates a block, is added as a first generation transaction of the block.

That is, a block hash value including information, in which a difficulty coin of 50 BTC has been accumulated, is determined in the first block, and the block hash value is transferred to the second block. The difficulty coin of 50 BTC of the first difficulty coin is included to determine a block hash value of the second block. The block hash value including the difficulty coin of the second block becomes a previous block hash value of the third block, and a difficulty coin and a block hash value of the third block are determined by the previous block hash value.

The transaction fee may be autonomously determined between parties to a transaction. That is, when a royalty of a fashion design is determined and when a basic royalty is registered as transaction information during a generation transaction, a royalty is accumulated whenever a subsequent transaction, such as a second transaction or a third transaction, is made.

A blockchain is a huge distributed public ledger, which is copied in a plurality of nodes, and the plurality of nodes are connected through a peer-to-peer (p2p) network to form a blockchain network.

When a single piece of transaction information is generated, the transaction information is spread to numerous nodes distributed in the blockchain network.

As described above, when similarity of a clothes fashion design is greater than or equal to a reference value, the clothes fashion design is determined as a design related to a corresponding work to generate a blockchain ledger.

On the contrary, when the similarity is less than the reference value, the clothes fashion design is determined as a new creative work to perform the fourth operation (S130) of generating the blockchain ledger.

A process of generating the new blockchain ledger is the same as that described in the third operation (S120), and thus, repetitive detailed descriptions thereof will be omitted below.

As described above, when it is determined in the third operation (S120) that a new design is similar to an existing design and thus a blockchain book is generated, the fifth operation (S140) of distributing a royalty is performed.

Figure 5:
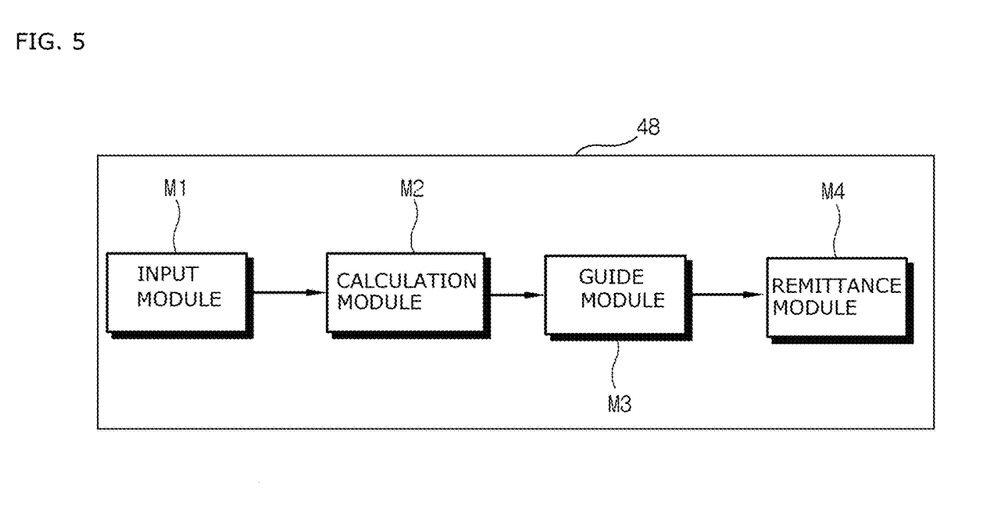
FIG. 5 is a block diagram illustrating a royalty management unit of the management server illustrated in FIG. 4.

That is, when the similarity is greater than or equal to the reference value, a royalty management unit 48 of the management server calculates a royalty to be paid by a late designer.

A blockchain generated in relation to a design includes a digital signature, a block header that stores transaction information, transaction information, and design information. The block header includes six pieces of information such as a version, a previous block hash, a merkle hash, a time, a bit, and a nonce.

In this case, design transaction performance is stored in the transaction information of the blockchain. That is, when an initial design creator creates and registers a new design, an initial blockchain is generated.

When a next design creator (hereinafter, referred to as a copyright user) downloads a design online, an identification code for the copyright user is automatically registered in the transaction information.

When a plurality of copyright users refer to an original design through such a method, each blockchain is generated.

The royalty management unit 48 includes an input module M1 which receives copyright data from transaction information attached to a blockchain, a calculation module M2 which calculates a royalty from the received copyright data, a guide module M3 which guides the calculated royalty to a copyright user, and a remittance module M4 which interworks with a server of a financial institution to remit a royalty deposited by the copyright user to a copyright holder.

In the royalty management unit 48 having such a structure, the input module M1 inputs a blockchain generated when a plurality of users access a server through the terminal 10a.

The calculation module M2 calculates the total royalty based on the number of times of transactions stored in input transaction information of the blockchain and a basic royalty.

In the case of the calculation, the royalty may be arithmetically distributed to the copyright holders, but by providing appropriate policies, a restriction may be imposed on the royalty being distributed to the copyright holders.

For example, when the copyright holder completely excludes the use of other persons, the use of the other persons is completely excluded, and when the use of other persons is permitted only at about three to four stages, a profit in a range of about 20% to about 30% is guaranteed.

In addition, a case, in which a variation between all chains of a copyright design is targeted for a profit, is introduced as a policy, a profit per unit may be less than 1%. However, when a large amount of the copyright design is used, it corresponds to a policy in which a large profit is expected.

For example, when a basic royalty is 100,000 won and the number of times of transactions is 10, the total royalty is calculated as 1 million won.

In this case, according to a royalty policy, when the use of other persons is completely excluded, a royalty is not paid at all, and when the use of the other persons permitted only at about three to four stages, a profit of 200,000 won to 300,000 won corresponding to 20% to 30% is distributed.

In addition, when a variation between chains of a copyright design is targeted for a profit and a profit per design is set to 10 won, a profit of 100,000 won is distributed when 10,000 designs are used.

The guide module M3 guides the royalty calculated as described above to users online.

When each user deposits the royalty through a financial institution such as a bank, the remittance module M4 remits the royalty to the copyright holder.

The remittance module M4 interworks with the terminal 10a of a payer and a server of a financial institution such as a credit card company or a bank and processes a royalty payment service.

A royalty profit for a clothes design may be generated through such a method.

Meanwhile, the blockchain management server of the present invention may also perform the following additional functions.

That is, the blockchain management server may perform a function of limiting purchase customers to sell. That is, the function is a function of, when a design is purchased, selling the design only a limited number of purchase customers. For example, when it is considered that a design A is sold to three persons, the design is not sold to other persons. Alternatively, when a corresponding design is to be exclusively possessed, three designs may also be exclusively sold. In this case, a designer and a platform distribute profits according to the standards.

In addition, the blockchain management server performs a function of associating pieces of information of a fabric and a pattern stored in a database (DB) with each other to sell. That is, pieces of technical information, such as a fabric, a pattern, and a color of a clothes design, a pattern and a color of a fabric of an accessory design, a pattern and a color of a fabric of a miscellaneous design, a color pattern design of a fabric surface, and composition information, a structure, and a mixing ratio of a raw material, are associated with each other to sell.

It is also possible to separately manage body type information and purchase history information of a specific customer.

Alternatively, it is also possible to authenticate a license holder for a limited edition design. That is, a purchaser of a limited edition product, to which a design is applied, may always check or authenticate a record of purchasing a genuine product of the limited edition product regardless of place by storing his or her information or nickname through a QR code or similar authentication attached to a product or guarantee.

A purchaser of a limited edition design may also receive benefits when a design is changed after authentication of the purchaser of the limited edition design or real name authentication. That is, it is possible to continue to purchase a design that suits the body shape of a customer who has purchased a limited edition design.

As described above, a system and a method for processing a copyright and profit distribution of a clothes fashion design using a blockchain according to the present invention have the following effects.

First, blockchain technology is matched with information about a clothes fashion design exchanged online, thereby easily identifying a copyright holder of the design and efficiently distributing a profit such as a royalty.

Second, a blockchain management server of the present invention may perform functions of limiting purchase customers to sell, storing pieces of pattern information in a DB to sell in an associated manner, changing and managing information about the body shape and a changed item of a regular customer, authenticating or identifying a license holder who has purchased a limited edition design, and providing benefits when a design is changed after authentication of a purchaser of a limited edition design or real name authentication.

What is claimed is:

1. A system for processing a copyright and profit distribution of a clothes fashion design using a blockchain, the system comprising:
   a terminal mounted with a related application and is configured, via the related application, to search for a previously registered design and register a clothes design;
   a management server configured to processes a data of the clothes design transmitted from the terminal through a network, to determine similarity of the clothes design data, and to generate a blockchain; and
   a royalty management server configured to interworks with the management server and to process a copyright and profit distribution of the clothes fashion design, wherein
   the management server comprises:
      an input unit configured to receive the data of the clothes design from the terminal;
      a comparison unit configured to determine the similarity between the clothes design and the previously registered design by comparing features of the clothes design including a shape and a color with features of the previously registered design including a shape and a color;
      a blockchain generation unit configured to generate the blockchain;
      a calculation unit configured to, with the blockchain generation unit, generate a blockchain related to the previously registered design when the determined similarity is greater than or equal to a reference value and to generate a blockchain related to the clothes design when the determined similarity is less than the reference value; and
      a royalty management unit configured to distribute and manage a royalty according to the generated blockchain,
   the generated blockchain comprises a digital signature for verifying authenticity of the data of the clothes design and transaction information, a block header, the transaction information, and design information,
   the block header includes a version, a previous block hash, a merkle hash, a time, a bit, and a nonce,
   the design information includes an identification code of a designer, the shape, and the similarity of the clothes designs, and
   when the block header is generated, the calculation unit is configured to determine a first block hash value, and when a next transaction is made, the calculation unit is configured to add a second block hash value to form the blockchain.

2. The system of claim 1, wherein the royalty management unit includes:
an input module configured to receive copyright data from the transaction information,
a calculation module configured to calculate the royalty from the received copyright data,
a guide module configured to guide the calculated royalty to a copyright user, and
a remittance module configured to, with a server of a financial institution, remit the royalty deposited by the copyright user to a copyright holder.

3. The system of claim 2, wherein the calculation module is further configured to calculate a total royalty based on a number of transactions stored in the transaction information of the blockchain and a basic royalty.

4. The system of claim 1, wherein the transaction information comprises an information of the clothes design registered, an information of the clothes design searched, and an information of a copyright user.

5. The systems of claim 1, wherein the identification code comprises a copyright holder.

* * * * *